Feb. 6, 1962 M. J. NOWLAN 3,020,357

RESONANT CIRCUITRY FOR A TRANSDUCER HEAD

Filed Dec. 3, 1956

INVENTOR.
Michael J. Nowlan
BY Morris A. Rabkin
ATTORNEY.

United States Patent Office 3,020,357

Patented Feb. 6, 1962

3,020,357
RESONANT CIRCUITRY FOR A TRANSDUCER HEAD

Michael J. Nowlan, Audubon, N.J., assignor to Radio Corporation of America, a corporation of Delaware Filed Dec. 3, 1956, Ser. No. 625,963
7 Claims. (Cl. 179—100.2)

Figure 1:
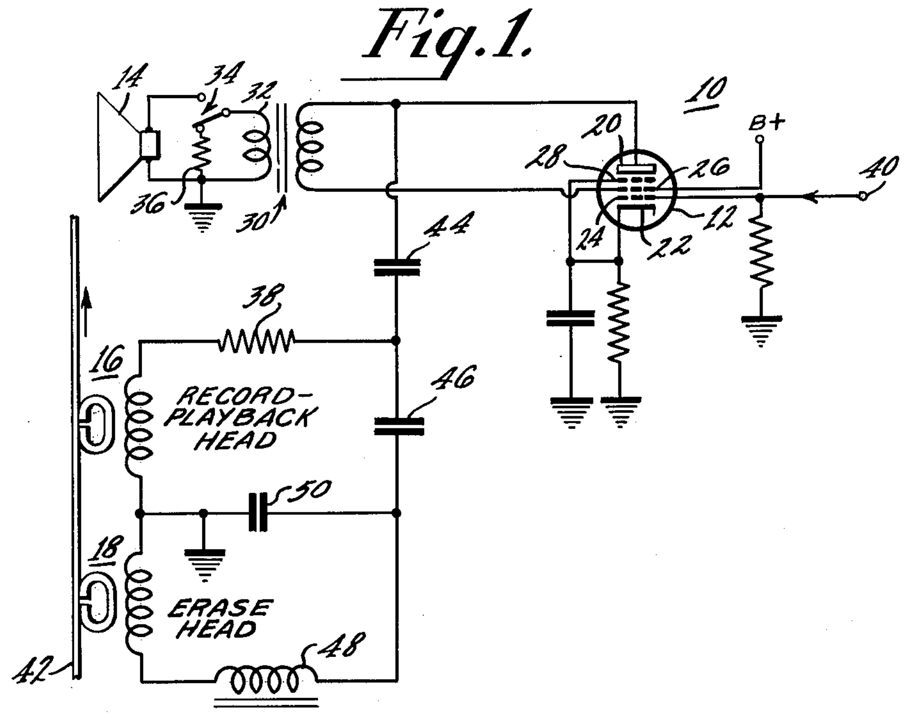

The present invention relates to magnetic recording apparatus, and more particularly to circuitry associated with the magnetic heads of such apparatus for applying operating signals thereto.

According to conventional engineering practice, an alternating-current signal, which is higher in frequency than the highest frequency to be recorded, is applied to the magnetic heads, which operate to record information on a magnetic record or to demagnetize the record thereby erasing previously recorded information. In order to fully demagnetize the record so as to completely erase the previously recorded information, sufficient power must be applied to the magnetic head which functions as the erase head. The high frequency current that is applied to the erase head may, for example, be several times greater in amplitude than the high frequency current applied to the recording head. The high frequency current applied to the recording head is referred to as recording bias.

It has been difficult to provide sufficient high frequency erase current to the erase head, particularly if a single source of high frequency signals, such as an oscillator, is used to supply erase current as well as recording bias. In the above-mentioned case, the problem is further complicated, since sufficient erase power must be fed to the erase head, although information signals are excluded therefrom so as not to adversely affect the operation of the recording head.

It has been attempted to connect a capacitor across the erase head for tuning the head to obtain a resonant circuit condition at the frequency of the erase signals. This has not been found altogether satisfactory, since the nature of the resonant circuit is such as not to prevent the driving stages, which supply the high frequency erase signals to the erase head, from becoming adversely affected, as by being overloaded. The somewhat critical operating conditions which are established also make the erase power delivered to the erase head subject to fluctuations due to variations in the voltage of the electric power lines to which the whole of the electrical equipment of the magnetic recording apparatus is connected. Thus, incomplete erasure may result if the voltage of the electric power lines becomes momentarily lower or is generally below standard magnitude, as in some rural low line voltage areas. Another attempt towards providing sufficient erase power has been to use specially designed erase heads. The additional cost of such heads and the expense of modifications to incorporate them in existing equipment has made their use undesirable.

Briefly described, the present invention provides an improved circuit adapted to be associated with a magnetic head, when it is operated to erase information previously recorded on a magnetic record member. The circuit, according to an embodiment of the invention, includes a capacitor and an inductor connected in a closed loop with the energizing coil of the erase head. The inductor is of a character to provide low electrical losses and, therefore, has a high "Q" or electrical quality factor. The values of the inductor and the capacitor are such that the maximum current is caused to flow through the head. This may occur when the loop is resonant at the frequency of the erase signals. Consequently, the electrical quality of the closed loop circuit, as expressed by the quality factor, Q, for the circuit is significantly increased. This circuit will not consume erase power by virtue of losses during operation. Instead, erase power is conserved and efficiently utilized only to erase the record member. The efficient operation provided by the circuit reduces the load upon the driving stages which develop or amplify the high frequency erase signals to be applied to the erase head. Thus, these stages may operate to develop more erase power for application to the erase head. Since the erase head driving stages will be under a lighter load during operation, these stages are not critically responsive to changes in external conditions, such as electric power line voltage variations.

It is, therefore, an object of the present invention to provide a circuit for improving the operation of magnetic recording apparatus.

It is a further object of the invention to provide a circuit for operating the erase head of a magnetic recorder with greater efficiency.

It is a still further object of the invention to provide circuitry for operating the erase head of a magnetic recorder so as to eliminate the adverse effects during the operation of the erase head due to variations in external conditions, such as electrical power line voltage variations.

It is a still further object of the invention to provide circuitry for achieving the foregoing objects thereof with a minimum of additional parts and at a lowest cost.

Figure 2:
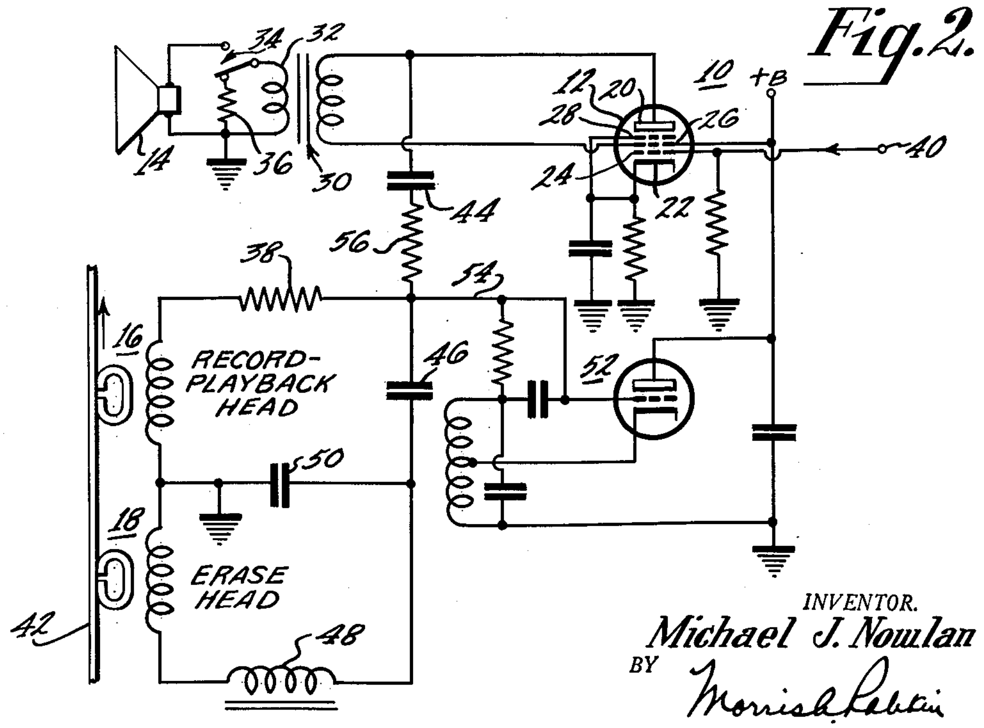

Other objects and advantages of the present invention will, of course, become apparent and immediately suggest themselves to those skilled in the art to which the invention is directed from a reading of the following description in connection with the accompanying drawings in which:

FIG. 1 is a schematic diagram depicting an embodiment of the present invention; and FIG. 2 is a schematic diagram showing the embodiment of the invention depicted in FIG. 1 connected to driving circuits different from the driving circuits of FIG. 1.

Referring now to FIG. 1, the invention, in accordance with one embodiment thereof, is shown as being incorporated in a circuit for magnetic recording apparatus. An amplifier stage 10 of conventional design, which includes a pentode tube 12, is used to alternatively drive a loudspeaker 14, when the magnetic recording apparatus is conditioned to reproduce magnetically recorded information, or to supply the magnetic heads of the apparatus with operating signals, when the apparatus is conditioned to record or erase. The pentode 12 includes a plate 20, cathode 22, control grid 24, screen grid 26 and suppressor grid 28. The pentode 12 is connected, in accordance with conventional engineering practice, to an output transformer 30 for driving the loudspeaker 14. The secondary winding 32 of the transformer 30 is connected to the loudspeaker 14 through a toggle switch 34 of the single pole double throw type. When the magnetic apparatus is used to play back recorded information signals, the secondary 32 is connected to the loudspeaker. When the amplifier stage 10 is conditioned to drive the magnetic heads 16 and 18 during recording operations, the secondary 32 is connected across a load resistor 36. A source of operating power for the amplifier stage 10 is illustratively designated as B+; the power supply of the magnetic recording apparatus being normally utilized for this function.

Signals for driving the amplifier stage 10 are applied to the control grid 24 thereof. A terminal 40 is illustratively designated as being the input of the amplifier stage 10 and is connected to the control grid 24. For purposes of explanation of the present invention, it will be assumed that the magnetic recording apparatus is conditioned to record. It should be noted that the switch 34 is connected to the load resistor 36, rather than to the loudspeaker 14. Other switching means (not shown) may be used to connect the magnetic heads in a different manner when the magnetic recording apparatus is conditioned to playback. The amplifier stage 10 is illustrated as the final or power amplifier of the magnetic recording apparatus.

In the circuit illustrated in FIG. 1, the output signals from the amplifier 10 are derived from the plate 20 of the pentode 12 and applied to the magnetic heads 16 and 18. The amplifier stage 10 in the circuit illustrated in FIG. 1 is adapted to amplify both information signals and the high frequency signal which is used as recording bias and an erase signal. The high frequency signal is at a predetermined frequency well above the range of frequencies of the information signals. For example, the information signals may be in the audio frequency range and the high frequency signal may be at more than twice the highest audio frequency to be recorded. The use of a single amplifier stage for amplifying the high frequency signal together with the information signals is an expedient well known in the art at the present time. However, problems are presented in providing high frequency current of sufficient magnitude to permit the erasure of all signals that are previously recorded on the record member without adversely affecting the recording of information signals.

The magnetic heads 16 and 18 of the magnetic recording apparatus are supplied with the operating signals including the high frequency signal and the information signals. Each of the heads includes a core of magnetic material and operating coil. The construction of the heads may be conventional. One of the heads 16 functions as a record head and playback head. The other of the heads 18 operates as an erase head. The heads are adapted to cooperate with a magnetic record, illustrated herein as a magnetic tape 42. After passing over the erase head 18, the tape 42 passes over the record head 16. During the recording operation the erase head applies a high frequency, alternating magnetic field to the tape 42 so as to completely remove all signals previously recorded thereon. Therefore, a clear, clean tape is available for scanning by the record head 16.

A connection between the plate 20 of the pentode 12 and the heads 16 and 18 is provided. This connection includes a blocking capacitor 44, which serves to block the passage of direct current from the plate to the heads while permitting the passage of alternating current signals including the information signals and high frequency signal. This connection from the plate 20 of the pentode 12 divides into two branches at a junction located after the blocking capacitor 44. One branch is connected to the record head 16 through a coupling registor 38 and the other branch is connected to another capacitor 46. An inductor 48 providing characteristics which improve the operation of the circuit is connected between the capacitor 46 and the erase head 18. A capacitor 50 is connected between the junction of the inductor 48 and the erase head 18.

It was mentioned above that the record head and the erase head may be of conventional design. Conventional erase heads possess a very low electrical quality factor referred to in the foregoing, and in the art, generally, as the "Q." Thus, the erase head has a very low Q. The Q of an inductive element is defined as the ratio of the inductive impedance of the element to the resistance of the element at the frequency of operation of the element. In the case of the erase head 18 this frequency will be the frequency of the high frequency signal. The Q of the element is also an indication of the electrical losses therein during operation. The inductor 48 provides negligible electrical losses at the high frequency of the erase signals. Thus, the Q of the inductor 48 is very much higher than the Q of the erase head 18. Thus, the inductor 48 has relatively high alternating current impedance as compared to the direct current impedance (resistance) thereof. It has been found that the Q of the erase head is, approximately, two whereas the Q of the inductor may be well over fifty.

It will be noted that the capacitor 50, the inductor 48 and the erase head 18 are connected in a closed loop circuit. This loop circuit is energized by signals from the amplifier stage 10, which are applied across the capacitor 50. Thus, an inductive branch comprising the head 18 and the inductor 48 are connected in parallel with a capacitive branch comprising the capacitor 50. These paralleled branches are connected effectively in parallel with the plate or output circuit of the amplifier driving stage 10. The value of the capacitor 50 and inductor 48 is chosen so that the closed loop circuit is resonant at the high frequency of the erase signal.

During operation, the amplifier 10 drives both the erase head 18 and the record head 16. These two heads 16 and 18 and the circuit elements associated therewith function to draw current from the output of the amplifier 10 thereby loading the amplifier. The erase head 18 must draw sufficient current of the high erase frequency to develop a high frequency alternating electromganetic field of sufficient power to fully erase signals recorded on the tape 42. Proper operation of the erase head would be precluded if the erase head overloads the driving amplifier 10, particularly at the high frequency of the erase signal, so that the amplifier 10 would not develop sufficient power for the erase head. The current through the erase head would, therefore, be insufficient to completely erase signals recorded on the tape 42. A problem ancillary to the overloading of the amplifier 10 is that it may not be possible to sufficiently isolate the erase head 18 from the record head 16. Such isolation is needed so as to exclude information signals from the erase head 18 without decreasing the magnitude of the current at the erase signal frequency flowing through the erase head to below the minimum magnitude to obtain erasure. Provisions for tuning the erase head so as to provide a parallel resonant circuit are not altogether satisfactory, since the very low Q of the erase head would prevent efficient operation of a parallel resonant circuit. The use of the high Q inductor 48 in a loop circuit, which is resonant at the erase frequency, will be found to solve the primary problem of providing sufficient current through the erase head 18 at the erase signal frequency without overloading the driving amplifier 10, and to present means for the solution of the above-mentioned ancillary problem.

With the inductor 48 connected in the resonant loop circuit, the Q of this circuit is materially increased. Consequently, the efficiency of the circuit is increased. Power is conserved in the circuit and more completely utilized to develop the electromagnetic field for erasing the tape 42. Since the resonant loop circuit is of a higher Q than the circuits used heretofore, the load on the driving amplifier 10 is materially decreased. Thus, the amplifier 10 operates with greater efficiency and developes more current at the frequency of the erase signal for application to the erase head 18.

The smaller demands of the erase head circuit on the driving amplifier 10 permit better isolation of the erase head 18 from the record head 16. The capacitor 46, through which signals are transmitted from the amplifier 10 to the erase head 18, may be of much smaller value. The value of this capacitor 46 may be sufficient to present an impedance capable of blocking information signals in the audio frequency range, while passing erase signal of higher frequency. The record head 16 therefore, is operated independently of the erase head 18 and is not adversely affected thereby.

The circuit of FIG. 2 is, in many respects, similar to the circuit of FIG. 1, and like parts in both circuits are identified by the same reference numeral. In the circuit of FIG. 2 an oscillator stage 52 is used for generating a signal at the desired high frequency for direct application to the heads 16 and 18, without the use of a common amplifier for information and high frequency signals. The amplifier 10 serves only to amplify the information signals to be recorded on the tape 42. These information signals are applied to the input terminal 40 of the amplifier 10.

The oscillator 52 is illustratively shown as being of the Hartley type. The oscillator is connected to be powered by the source of operating potential designated at B+, which supplies operating power for the amplifier 10. Output signals from the oscillator are applied by way of a connection 54 to the record head and erase head circuits. An isolation resistor 56 is connected in series with the blocking capacitor 44 to the plate 20 of the pentode tube 12 in the amplifier circuit 10. This isolation resistor 56 prevents the flow of high frequency current into the amplifier 10. Thus, substantially, all of the high frequency current generated by the oscillator 52 is supplied to the heads 16 and 18.

The high frequency alternating current signal is applied through the capacitor 46, which prevents the transmission of information signals, to the resonant loop circuit of the erase head 18. The resonant loop circuit provides for efficient operation of the erase head 18 by virtue of the inclusion therein of the high Q inductor 48. This efficient, high Q resonant loop circuit eliminates overloading of the oscillator and permits efficient operation thereof. Consequently, sufficient current at the erase frequency is supplied as recording bias to the record head 16 and to the erase head 18.

The circuit for magnetic recording apparatus provided by the present invention permits efficient operation of the stages for driving the heads 16 and 18 without overloading. Thus, external conditions, such as momentary variations in line voltage, lowered line voltage, temperature changes and the like does not reduce the current to the heads. Complete erasure of the signals on the tape 42 at all times, is therefore, assured.

What is claimed is:

1. A circuit for a magnetic head comprising means for applying a signal to said head for energizing said head at a predetermined frequency, and means providing for maximum alternating current flow through said head at said predetermined frequency, said means including a capacitor and an inductor presenting negligible electrical losses at said predetermined frequency connected in a closed loop circuit with said head.

2. A circuit for a magnetic head comprising a source of signals for energizing said head, said signals having components at a predetermined frequency, means for applying signals from said source to said head, and means providing for a resonant condition of operation of said head at said predetermined frequency, said means including a capacitor and an inductor having high impedance in relation to the resistance thereof at said predetermined frequency, said inductor being connected in a closed loop circuit with said head.

3. A circuit for a magnetic head comprising a source of signals for energizing said head, said signals having components at a predetermined frequency, means for applying signals from said source to said head, and means providing for maximum current flow through said head at said predetermined frequency, said means including a capacitor and an inductor connected in a closed loop circuit with said head for increasing the Q of said closed loop circuit at said predetermined frequency in relation to the Q of said closed loop circuit including said head and said capacitor alone.

4. A circuit for a magnetic erase head comprising a source of alternating current signals for energizing said head at a predetermined frequency, means for applying signals from said source to said head, and means providing for a resonant condition of operation of said head at said predetermined frequency, said last-named means including a capacitor and an inductor connected in series with said head in a closed loop circuit, said inductor having a minimum electrical resistance for increasing the Q of said closed loop circuit at said predetermined frequency in relation to the Q of said closed loop circuit including said head and said capacitor alone.

5. In magnetic recording apparatus for recording information on a magnetic record member in the form of electrical signals extending in frequency over a given range of frequencies, said apparatus including a source of signals at a predetermined frequency higher than the highest frequency in said range and a magnetic head for cooperation with said record member for erasing information signals recorded thereon, a circuit for operating said head comprising a capacitor and an inductor connected in series with said head to provide a closed loop circuit resonant at said predetermined frequency, said inductor providing an electrical quality factor for said loop circuit substantially higher than obtained for said loop circuit including said head and said capacitor alone, and means for coupling said source to said closed loop circuit so that said closed loop circuit will be in parallel with said source.

6. In magnetic recording apparatus for recording information on a magnetic record member in the form of electrical signals extending in frequency over a given range of frequencies, said apparatus including a source of signals at a predetermined frequency higher than the highest frequency in said range, a magnetic head for cooperating with said record member to record information signals thereon, and a magnetic head for cooperating with said record member for erasing information signals recorded thereon, a circuit for operating said erasing head comprising a capacitor and an inductor connected in series therewith to provide a closed loop circuit resonant at said predetermined frequency, said inductor providing a value of Q for said loop circuit substantially higher than the value of Q for said loop circuit including said erasing head and said capacitor alone, another capacitor being of a character to block the flow of alternating current of any frequency in said range of frequency, and a connection having two branches for coupling said source to said recording head and in parallel with said loop circuit, said branch connected to said loop circuit including said other capacitor.

7. A circuit for use in magnetic recording and reproducing apparatus having an erase head including a coil and source of oscillation for energizing said head which comprises an inductor connected in series with said coil of said head having a Q higher than the Q of said head, and a capacitor connected in parallel with said coil and said inductor for resonating said coil and inductor at the frequency of oscillation of said source.

References Cited in the file of this patent

UNITED STATES PATENTS

| | | |
|---|---|---|
| 2,235,132 | Wooldridge | Mar. 18, 1941 |
| 2,351,009 | Camras | June 13, 1944 |
| 2,596,621 | Van Loon et al. | May 13, 1952 |
| 2,898,408 | Folse | Aug. 4, 1959 |

FOREIGN PATENTS

| | | |
|---|---|---|
| 97,306 | Sweden | Nov. 7, 1939 |
| 527,703 | Italy | June 4, 1955 |

OTHER REFERENCES

Fiat Final Report 705 (Office of Military Government for Germany (U.S.) (pages 11 and 12)).